United States Patent [19]

Earle et al.

[11] Patent Number: 5,273,768
[45] Date of Patent: Dec. 28, 1993

[54] PROCESSING FRESH COLD WATER FISH

[75] Inventors: Roland D. Earle, Plantation; Barrie F. Taylor, Miami, both of Fla.

[73] Assignee: Greenbranch Enterprises, Inc., Key Largo, Fla.

[21] Appl. No.: 949,662

[22] Filed: Sep. 23, 1992

[51] Int. Cl.$^5$ ................................ A23B 4/12
[52] U.S. Cl. ............................ 426/268; 426/335; 426/643
[58] Field of Search ............. 426/643, 268, 327, 332, 426/335

[56] References Cited

U.S. PATENT DOCUMENTS

| | | | |
|---|---|---|---|
| 2,064,872 | 7/1935 | Ash | 426/643 |
| 2,093,069 | 9/1937 | Bedford | 426/643 |
| 3,036,923 | 5/1962 | Mahon | 426/327 |
| 3,255,021 | 6/1966 | Earle . | |
| 3,395,024 | 7/1968 | Earle . | |
| 3,600,198 | 8/1971 | Gonthier | 426/335 |
| 3,804,964 | 4/1974 | Hogstedt | 426/643 |
| 3,875,313 | 4/1975 | Brotsky | 426/643 |
| 3,959,507 | 5/1976 | D'Aquin | 426/643 |
| 3,991,218 | 11/1976 | Earle . | |
| 4,136,204 | 1/1979 | Hughes | 426/643 |
| 4,293,578 | 10/1981 | Stone | 426/643 |
| 4,431,679 | 2/1984 | Crawford | 426/335 |
| 4,517,208 | 5/1985 | Crawford | 426/335 |
| 4,585,659 | 4/1986 | Hussey | 426/332 |
| 4,601,909 | 7/1986 | Nagoshi | 426/643 |
| 4,670,277 | 6/1987 | Brotsky | 426/643 |
| 4,832,972 | 5/1989 | Toledo-Flores . | |
| 4,937,092 | 6/1990 | Brotsky | 426/643 |
| 4,978,546 | 12/1990 | Haram | 426/327 |

FOREIGN PATENT DOCUMENTS 54-2363  1/1979  Japan ................... 426/643

OTHER PUBLICATIONS

Dyer 1945 The Journal of Fisheries Research Board of Canada vol. 6, pp. 351-358.
Dyer et al. 1945 The Journal of Fisheries Research Board of Canada vol. 6 pp. 359-367.
Neilands 1945 The Journal of Fisheries Research Board of Canada vol. 6 p. 368-379.
Is Our Fish Fit to Eat? Consumer Reports Feb. 1992 pp. 108-114.

*Primary Examiner*—Carolyn Paden
*Attorney, Agent, or Firm*—Neil F. Harkva

[57] ABSTRACT

A method of treating fresh cold fish is disclosed wherein eviscerated fish carcass is washed and treated with a bactericide to produce a fish in which the formation of trimethylamine is retarded. The bactericide is maintained at an elevated temperature which is selected to enhance reduction and retardation of bacterial outgrowth. Uncharged acetic acid is utilized as an example of such a bactericide.

20 Claims, 4 Drawing Sheets

PROCESSING FRESH COLD WATER FISH

FIELD OF THE INVENTION

This invention relates to the preparation of fresh cold water fish found in salt water. More particularly, it is directed to the processing of fresh cold water fish to retard the formation of trimethylamine (TMA) from trimethylamine oxide (TMAO) by producing a bactericide environment for spoilage-causing bacteria.

BACKGROUND OF THE INVENTION

The problem confronting the fresh fish industry is enormous. In its February, 1992 issue, Consumer Reports published the results of a six month investigation regarding fresh fish. In the industry, fresh fish refers to fish that has not been frozen. The extensive report raises questions concerning the quality and wholesomeness of fresh fish and the safety of consumers eating the fish.

The information contained in this Consumers Report article entitled "Is Our Fish Fit to Eat?" is hereby incorporated herein by reference in its entirety.

Information concerning trimethylamine and trimethylamine oxide is extensive and well known. The Journal of the Fisheries Research Board of Canada, volume 6, published in 1945 includes articles entitled "Factors Affecting Triamineoxidease" by J. B. Neilands; "Amines in Fish Muscle: I. Colormetric Determination of Trimethylamine as the Picrate Salt" by W. J. Dyer; and "Amines in Fish Muscle: II. Development of Trimethylamine and Other Amines" by W. J. Dyer and Yvonne A. Mounsey. These 1945 articles are hereby incorporated herein by reference in their entireties.

U.S. Pat. No. 4,832,972 discloses a supercooling process for tropical fish that produces a high salt content in the supercooled fish maintained in a non-frozen state at temperatures in the range of about 0° to about −5° C. The fresh fish treatments include thermal blanching treatments at about 90° C. and treating the fish with an antimicrobial agent.

Marine organisms have body fluids of slightly higher tonicity than seawater to prevent the loss of body water by osmosis to the surrounding seawater. Trimethylamine N-oxide (TMAO) is an odorless metabolite commonly found in marine fish and contributes to intracellular osmolarity. The tissues of marine fish contain high concentrations of TMAO that enable the fish to live in salty water. The TMAO counteracts the tendency of seawater to extract water from the fish tissues.

During the spoilage of fish, bacteria in fish flesh reduce TMAO in the fish tissues to trimethylamine (TMA), which primarily supplies the characteristic odor and flavor of spoiled marine fish. That is, TMA is the normal bacterial breakdown product of TMAO.

Bacteria from the skin and intestines of fish reduce TMAO in the absence of oxygen, scarcity of oxygen, or under low oxygen conditions. In other words, the bacteria use TMAO for life in the absence of oxygen. TMA concentrations in fish muscle may be used as the indicator of the extent and rate of fish spoilage. Levels above 15 mg TMA-N (1.08 mmoles TMA)/100 grams of fish flesh are considered in the industry to be a sign of spoilage in fish.

Typically, any bacteria live only over a temperature span of about 30–40° C. The temperature span for a specific organism is determined primarily by the lipid composition of its cellular membranes. The cellular membrane rigorously controls the entry and exit of materials forming a living cell. Therefore, the cellular membrane is a key to life. It protects the intracellular environment from dangerous components of the external environment, and maintains an environment for the stability and functioning of cellular components and reactions.

At temperatures above the upper temperature limit for life, the lipids in the cellular membrane melt and thereby destroy the barrier formed by the cellular membrane. Cold water fish inhabiting waters of 0–10° C. have bacteria associated with them that are adapted to those environmental temperatures.

The alginate coating process used in the present invention is disclosed in U.S. Pat. Nos. 3,255,021; 3,395,024; and 3,991,218. These earlier patents disclose the use of an alginate-containing solution and a gelling solution used in sequence to form a substantially continuous film over a substrate such as meat, seafood, poultry and the like.

The coating solution is composed of sodium alginate and maltodextrin dissolved in water. The substrate is first dipped into the coating solution and then dipped into a gelling solution of calcium chloride thickened by a trace amount of cellulose gu dissolved in water.

The disclosures of U.S. Pat. Nos. 3,255,021; 3,395,024; and 3,991,218 are hereby incorporated herein by reference in their entireties. Thus, a further detailed disclosure of the particular manner of forming the edible continuous alginate coating is unnecessary. However, it has been found that the particular temperatures and pH values for the separate coating solutions as disclosed herein produce unexpected results.

Moreover, through experimentation, we discovered that lactic acid used in combination with the gelling solution does not reduce spoilage-causing bacteria, which cause the reduction of TMAO to TMA.

PURPOSE OF THE INVENTION

The primary purpose of the invention is to produce a simple, commercial process for retarding the spoilage of fresh cold water fish tissues or flesh.

Another object of the invention is to provide a procedure for processing fresh cold water fish that retards the reduction of TMAO to TMA and extends the shelf-life of fresh fish for several days.

SUMMARY OF THE INVENTION

The invention is directed to a fresh cold water fish processing method to retard spoilage of cold water fish. The fresh cold water fish is first cut and its entrails removed to produce an eviscerated fish carcass that is then washed to effect cleaning of exposed surfaces of the fish flesh.

The washed fish flesh is promptly subjected to a bactericide in an amount sufficient to substantially reduce the number of spoilage-causing bacteria and retard the formation of trimethylamine in the fish flesh. The bactericide is effective to penetrate cell membranes in the fresh cold water fish wherein the bactericide adversely affects the intracellular pH of the spoilage-causing bacteria.

A bactericide treating zone is provided for received eviscerated fish flesh from the washing step. The fish flesh is held within the bactericide treating zone for a time sufficient to allow the bactericide to produce its reduction and retardation results. A particular feature of the invention is directed to providing a bactericide solution maintained at an elevated temperature effective to enhance the reduction and retardation results. The elevated temperature is sufficient to effect pasteurization of the fish flesh.

The fish cutting step includes the step of filleting the eviscerated fish carcass to form a plurality of fish flesh parts having exposed surfaces that are washed and treated by a bactericide solution. Where the bactericide solution is at an elevated temperature, the fresh fish flesh is kept in the heated solution for a time sufficient to allow the bactericide to produce the desired reduction and retardation results.

In another feature of the invention, before the fish cutting step, the whole fresh cold water fish is maintained at a temperature sufficiently below ambient temperature to inhibit the reproduction of spoilage-causing bacteria until the cutting step. After treating the fish portions with the bactericide solution, an alginate coating is applied over the exposed surfaces of the fresh fish parts to produce a sealing effect along the fish flesh surfaces.

In a specific embodiment, the method comprises providing an aqueous acidic solution for treating the exposed fish flesh surfaces. The aqueous acidic solution includes an acid adapted to form a bactericide environment for spoilage-causing bacteria that produce trimethylamine in fresh cold water fish.

The aqueous solution is effective to kill the spoilage-causing bacteria on the exposed flesh surfaces without producing a cooked flavor distinctive from the natural cooked flavor of the fish. The exposed flesh surfaces are treated with the aqueous solution for a time sufficient to substantially reduce the number of spoilage-causing bacteria thereon without acquiring any flavor derived from the solution being absorbed by the fish flesh. Moreover, the acid of the aqueous solution is effective to penetrate cell membranes of the spoilage-causing bacteria in fresh cold water fish and adversely affect the intracellular pH of the bacteria.

In a specific embodiment, the acid is an uncharged acetic acid. A specific aqueous acid solution consists essentially of one part of a 5% vinegar to five parts of water. This produces about five parts of acetic acid in about 600 parts of solution.

The fish flesh treatment with the aqueous solution is effective to maintain the level of trimethylamine for an extended period of time at less than about 15 mg TMA-N per 100 grams of fish flesh. More particularly, the shelf life of the fresh fish is extended for several days. The fresh cold water fish being treated in this invention includes fin fish such as Tuna, Cod, Alaska Pollock, Salmon, Haddock, Yellowtail Flounder and the like.

Another feature of the invention includes heating the aqueous solution to an elevated temperature sufficient to enhance the retardation of trimethylamine formation in the fish flesh. The period of time at the elevated temperature is effective to preclude discoloration of the fish flesh due to cooking.

In a specific embodiment, the elevated temperature is at least 20° C. and maintained in the range of from about 20° C. to about 50° C. for the cold water fish. The period of time at the elevated temperature is at least 6 seconds. More specifically, the time at temperature is maintained in the range of from 6 to about 15 seconds. The fish is subjected to rapid cooling in an aqueous bath maintained at about 5° C.

Another feature of the invention comprises applying an alginate coating over the acid solution treated exposed surfaces to produce a sealing effect along the fish flesh surfaces. The alginate coating applying step includes providing an aqueous alginate-containing solution and an aqueous gelling solution. The gelling solution is maintained with a pH of at least as low as 4.0.

In a specific embodiment, the gelling solution contains acetic acid to maintain the gelling solution at the desired pH level. The temperature of the alginate-containing solution and the gelling solution is maintained at a lower level to cool the fish flesh from the effects of the elevated temperature treatment while producing the alginate coating over the exposed surfaces of the fresh fish. The lowered temperature of the alginate-containing solution and gelling solution is in the range of about 2° C. to about 5° C.

BRIEF DESCRIPTION OF DRAWINGS

Other objects of this invention will appear in the following description and appended claims, reference being made to the accompanying drawings forming a part of the specification.

DETAILED DESCRIPTION

Figure 1:
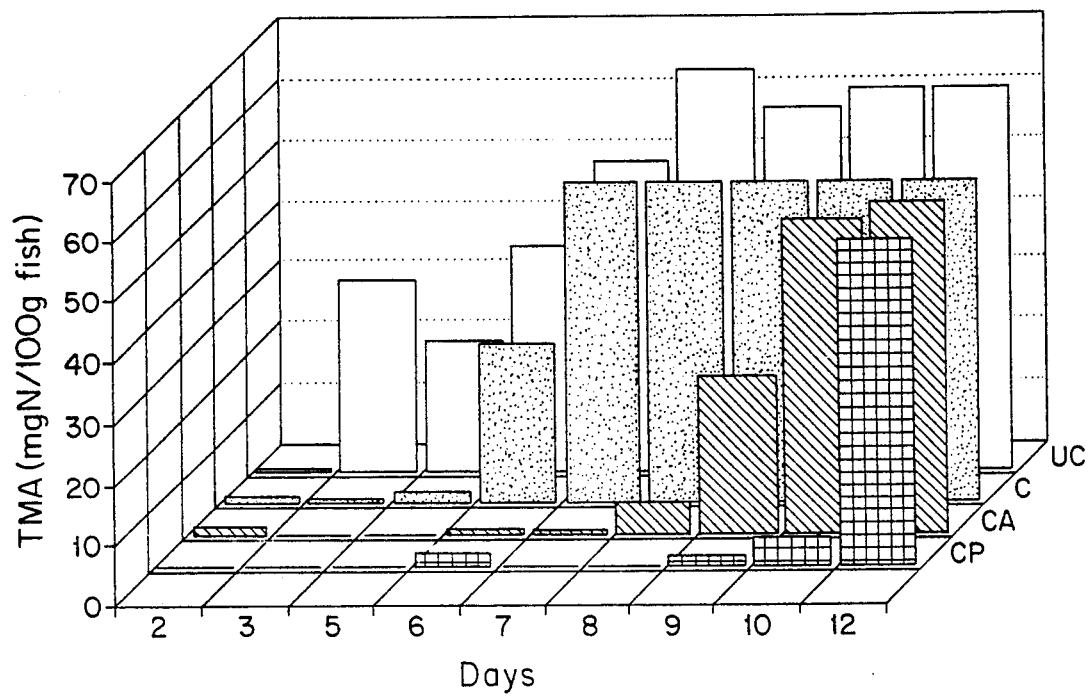
FIGS. 1 through 7 are bar graphs showing the results obtained in each related example conducted in accordance with this invention.

In Examples I-VI, fresh cold water fish were shipped from Alaska or Seattle as whole specimens by overnight mail with blueice packs to the laboratory. The fish were either immediately gutted and filleted upon arrival at the laboratory or stored for about 24 hours in the cold at about 5° C.

In all examples, portions of the eviscerated fish flesh weighing about 15-30 gm (wet weight) were used for the treatments. During the handling and treatment of the fish pieces, the forceps, balance and bench were periodically cleaned and swabbed with 70% ethanol. The pieces of fish were held in forceps until coated. A flat plastic scoop was used to place the coated fish portions in a plastic bag thereby avoiding damage to the alginate coating.

A dilute aqueous solution of acetic acid consisted of one volume of 5% white vinegar to five volumes of MilliQ or distilled water. Fish portions were immersed in (1) dilute acetic acid at ambient temperature, or (2) heated dilute acetic acid or (3) heated MilliQ water for 6 seconds. An alginate coating was applied after the acid and elevated temperature treatments. The alginate-containing solution was cold (0-5° C.) and the gelling solution was adjusted to pH 4 with acetic acid. The coated fish pieces were placed in unsealed plastic bags and stored in a refrigerator at 5° C.

Fish caught in the North Atlantic (Grand Banks and Nov Scotia) were returned to Boston where they were filleted at the pier. Fillets of Cod, Haddock and Yellowtail (a flat fish) were packed in blue-ice and shipped overnight to the laboratory. Portions of fish weighing about 15-30 gm (wet weight) were prepared and used for the treatments.

Dilute acetic acid was prepared by adding one volume of 5% white vinegar to five volumes of MilliQ water. Before the coating procedure, the fish pieces were immersed in diluted acetic acid for 6 seconds. The aqueous acidic solution was maintained at an elevated temperature of 50° C. The aqueous solution containing the alginate and the gelling solution were both cold (0-5° C.) with a pH 4.0 adjusted with acetic acid prior to cooling.

The fish pieces treated with the warm acetic acid solution and coated with alginate are designated the CP series. The control series (UC) were untreated and uncoated fish pieces. All fish pieces were placed in plastic bags and stored in a refrigerator set at 5° C.

TRIMETHYLAMINE EXTRACTION

The procedure for extraction of trimethylamine (TMA) was the same throughout the experiments. After incubation for the desired intervals the fish pieces were either immediately extracted for TMA or frozen. The fresh or frozen fish tissue was extracted with freshly prepared 5% (w/v) trichloroacetic acid, using 3 ml for every gram of wet weight of fish tissue.

After blending for 1 minute in a Waring blendor, the extract was collected by filtration under suction through a Whatman #1 filter paper. The extracts were further clarified by another filtration through a Millipore filter (cellulose acetate, 47 mm diameter, 0.45 μm pores). The extracts were either immediately analyzed for TMA or frozen in either polystyrene tubes or glass bottles until analyzed for TMA.

ASSAY FOR TMA

The following picrate assay reagents and procedure was used in all the fish experiments for determining TMA content in the fish pieces.

REAGENTS (i) 10% formaldehyde (ii) 25% weight per volume (w/v) KOH - This was prepared fresh each day because CO, from the air interferes with the method.

(iii) Toluene (iv) Sodium sulfate, dry granular (v) 0.02% (w/v) Picric acid dissolved in toluene prepared from a stock solution of 2% (w/v) in toluene. Trimethylamine (TMA) standard solutions:

(i) 0.682 g of trimethylamine hydrochloride dissolved in 1 ml of concentrated HCl and made up to 100 ml with MilliQ water in a 100 ml volumetric flask.

(ii) 1 ml of first solution (i) in 1 ml of concentrated HCl and made up to 100 ml with MilliQ water in a 100 ml volumetric flask. This solution contained 0.01 mg TMA-N per ml. Reagent blank solution: 1 ml of concentrated HCl plus 99 ml MilliQ water.

PROCEDURE 1. 4 ml of TMA standard solution (i) or reagent blank measured into 20 ml tubes with ground glass stoppers.

2. 1 ml 10% formaldehyde added to each tube, vortex and then 10 ml of toluene added to each tube to form a resultant upper layer.

3. 3 ml 25% KOH added to each tube that was well shaken by inverting. The inverted tubes were allowed to stand letting the toluene and water layers separate.

4. Most of the toluene layer was removed to a test-tube containing about 0.4 g of dry sodium sulfate to form a dry toluene extract.

5. 3 ml of the dry toluene extract was added to 3 ml of 0.02% picric acid solution.

6. Read absorbance at 410 nm in 1 cm cuvettes in a spectrophotometer with the reagent blank, carried through the derivatization procedure, as the spectrophotometer blank. The Standard Curve produced:

1. 1.0, 2.0, 3.0 and 4.0 ml portions of the second TMA solution (ii) were first prepared.

2. Each tube was made up to 4 ml with the reagent blank. 4 ml of reagent blank was used to form the blank for the spectrophotometer.

The determination of bacterial plate counts for the fish experiments was effected as follows.

The medium for growing the bacteria contained (in grams):

| Tryptone | 5.0 |
|---|---|
| Yeast extract | 2.5 |
| Glucose | 1.0 |
| Bactoagar | 15.0 |
| NaCl | 13.4 |
| $MgCl_2.6H_2O$ | 2.6 |
| $MgSO_4.7H_2O$ | 3.45 |
| KCl | 0.165 |

The pH of the growing medium was adjusted to 7.0 with 0.1M Tris (tris-hydroxymethylaminomethane) buffer having a pH of 8.0, using about 1 ml of buffer per 3 liters of medium. A salts solution for blending fish tissue and for serial dilutions was prepared as above but without tryptone, yeast extract, glucose and bactoagar.

Fish samples were blended in a Waring blendor for 1 minute with 20 ml of cold salts solution per gram of fish tissue. 0.5 ml samples of homogenates were decimally diluted in cold salts solution (4.5 ml). Six dilution tubes were used for each sample and 0.1 ml samples of the homogenate and the dilutions were plated in duplicate.

The temperature of the fish, salts solutions, dilutions and plates did not exceed 10° C. during processing. Sets of plates were incubated at room temperature and 5° C. Colonies were counted after 2 days at room temperature and after 7 days at 5° C.

EXAMPLE I

Table 1 and FIG. 1 show the results of Example I. A whole cold water fish, Ling Cod, was shipped overnight from Seattle to the laboratory where it was gutted and cut up into pieces the next day. The designated treatments were conducted on different pieces of the fish as follows:

UC=uncoated.

C=coated with an alginate coating.

CA=immersed for 6 seconds in an aqueous solution of dilute acetic acid at room temperature before coating.

CP=immersed for 6 seconds in an aqueous solution of dilute acetic acid heated to an elevated temperature of 35° C., followed by a 6 second immersion in an aqueous solution of dilute acetic acid at 5° C., then coated with an alginate coating.

Rapid accumulation of TMA occurred in uncoated fish samples, with TMA exceeding 10 mgN/100g fish within 3 days. All coating treatments were successful at retarding TMA production thereby extending the shelf-life of the fresh fish. The time needed to exceed 10 mgN/100g fish was 6 days for coated samples, 9 days for dilute acetic acid-treated-coated samples, and about 11 days for dilute acetic acid-heated-coated samples.

The indication is that, if a TMA standard of 15 mgN/100g fish were used instead of 10 mgN/100g fish, the results would have been more graphic.

TABLE 1

| Days | TMA (mgN/100 g fish) | | | |
|------|------|------|------|------|
|      | UC   | C    | CA   | CP   |
| 2    | 0.2  | 1.1  | 1.4  | 0.1  |
| 3    | 31   | 0.6  | 0.1  | 0.1  |
| 5    | 21   | 1.9  | 0.1  | 0.1  |
| 6    | 37   | 26   | 0.9  | 2.4  |
| 7    | 51   | 53   | 0.7  | 0.2  |
| 8    | 66   | 53   | 5.2  | 0.3  |
| 9    | 60   | 53   | 26   | 1.9  |
| 10   | 63   | 53   | 52   | 5    |
| 12   | 63   | 53   | 55   | 54   |

EXAMPLE II

Figure 2:
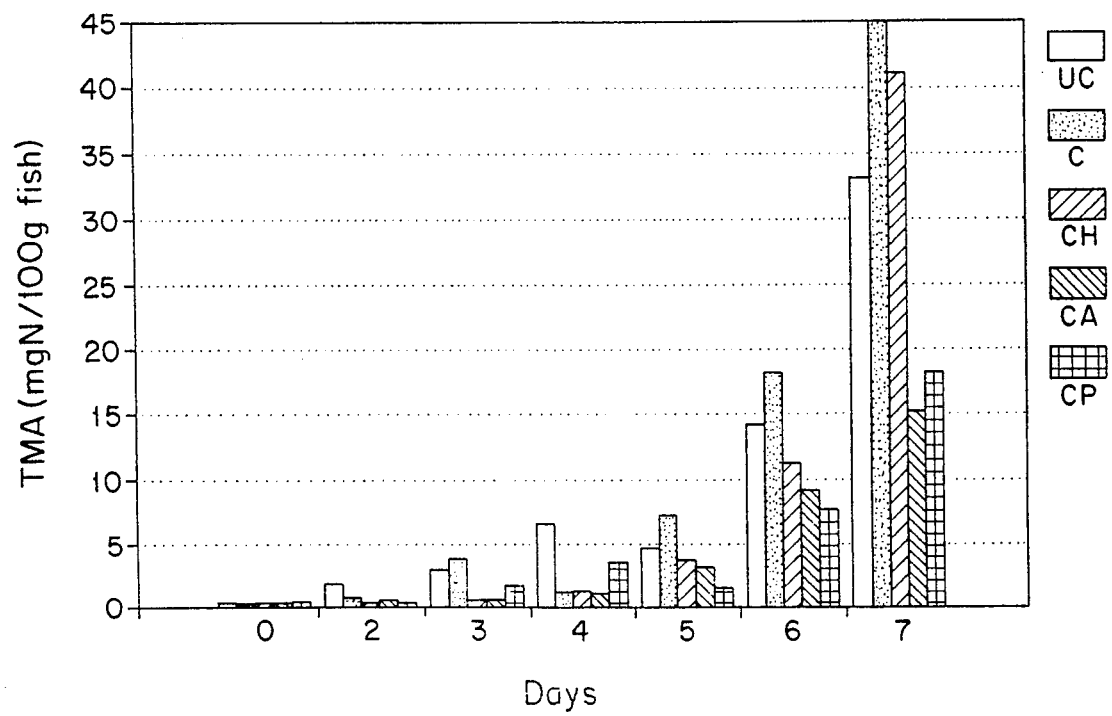

Table 2 and FIG. 2 show the results of Example II. A whole cold water fish, Grey or Black Cod, was shipped overnight from Alaska to the laboratory where it was gutted and cut into pieces the next day. The designated treatments were conducted as follows:

UC=uncoated.

C=coated with an alginate coating.

CH=immersed for 6 seconds in distilled water heated to 35° C. and then coated with an alginate coating.

CA=immersed for 6 seconds in an aqueous solution of dilute acetic acid maintained at room temperature and then coated with an alginate coating.

CP=immersed for 6 seconds in an aqueous solution of dilute acetic acid heated to 35° C., followed by a 6 second cooling immersion in an aqueous solution of dilute acetic acid maintained at 5° C., then coated with an alginate coating.

All coating treatments showed similar rates of TMA accumulation based on a TMA standard of 10 mgN/100g fish. There were slightly lowered rates in the samples first treated with dilute acetic acid before coating, i.e. CA and CP. The results indicate that heating with dilute acetic acid was slightly more effective than heating in distilled water.

TABLE 2

| Days | TMA (mgN/100 g fish) | | | | |
|------|------|------|------|------|------|
|      | UC   | C    | CH   | CA   | CP   |
| 0    | 0.3  | 0.3  | 0.3  | 0.3  | 0.3  |
| 2    | 1.7  | 0.7  | 0.3  | 0.4  | 0.2  |
| 3    | 2.8  | 3.7  | 0.4  | 0.5  | 1.5  |
| 4    | 6.5  | 1.1  | 1.1  | 0.9  | 3.3  |
| 5    | 4.5  | 7.1  | 3.5  | 3    | 1.3  |
| 6    | 14   | 18   | 11   | 9    | 7.5  |
| 7    | 33   | 45   | 41   | 15   | 18   |

EXAMPLE III

Figure 3:
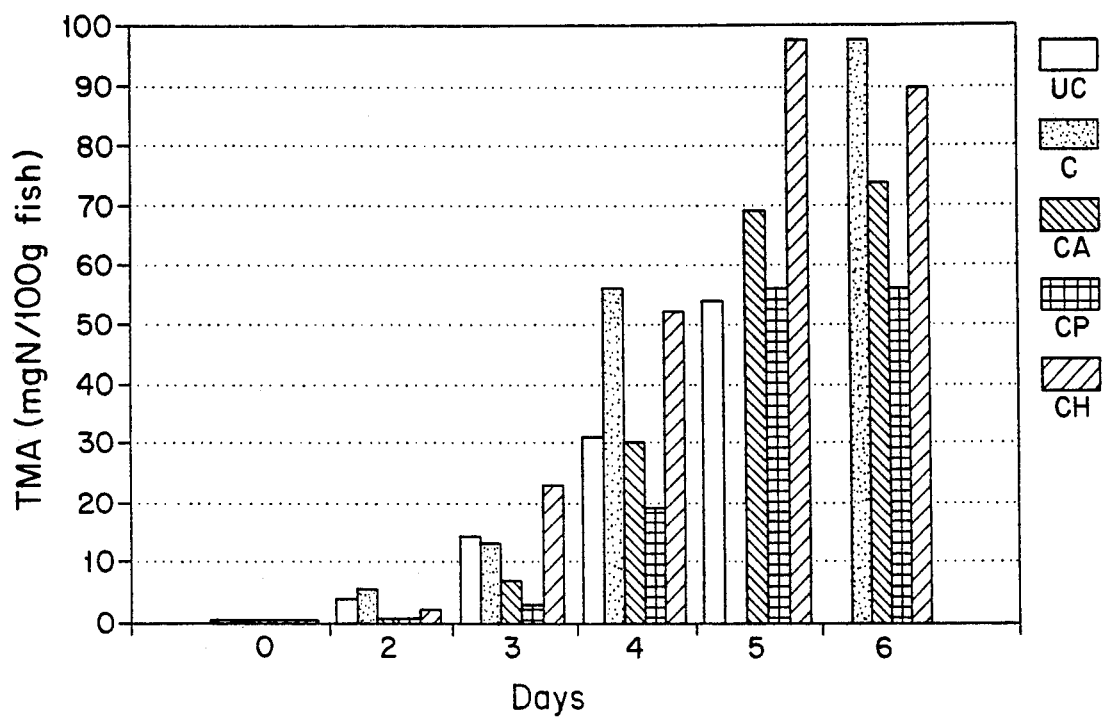

This example is summarized in Table 3 and FIG. 3. A whole cold water fish, Grey or Black Cod, was shipped overnight from Alaska to the laboratory where it was gutted and cut up into pieces the next day. The designated treatments were conducted as follows:

UC=uncoated.

C=coated with an alginate coating.

CH=immersed for 6 seconds in distilled water maintained at 40° C., then coated with the alginate coating.

CA=immersed for 6 seconds in dilute acetic acid solution maintained at 40° C., then coated with the alginate coating.

CP=immersed for 6 seconds in dilute acetic acid solution maintained at 40° C., followed by a 6 second cooling immersion in a dilute acetic acid maintained at 5° C., then coated with the alginate coating.

The uncoated, coated and distilled water-heated samples accumulated TMA at similar rates based on a TMA standard of 10 mgN/100g fish. Use of the heated dilute acetic acid, with or without a cooling immersion in dilute acetic acid (5° C.), retarded TMA accumulation by about 1 day.

The cooling immersion of the samples in the cooled coating was probably equivalent to the cooling immersion in the cooled dilute acetic acid solution (5° C.). Accordingly, in the later examples the second acetic acid dip at 5° C. was omitted.

TABLE 3

| Days | TMA (mgN/100 g fish) | | | | |
|------|------|------|------|------|------|
|      | UC   | C    | CA   | CP   | CH   |
| 0    | 0.2  | 0.2  | 0.2  | 0.2  | 0.2  |
| 2    | 3.9  | 5.4  | 0.5  | 0.5  | 2    |
| 3    | 14   | 13   | 6.8  | 2.6  | 23   |
| 4    | 31   | 56   | 30   | 19   | 52   |
| 5    | 54   |      | 69   | 54   | 98   |
| 6    |      | 98   | 74   | 56   | 90   |

EXAMPLE IV

Figure 4:
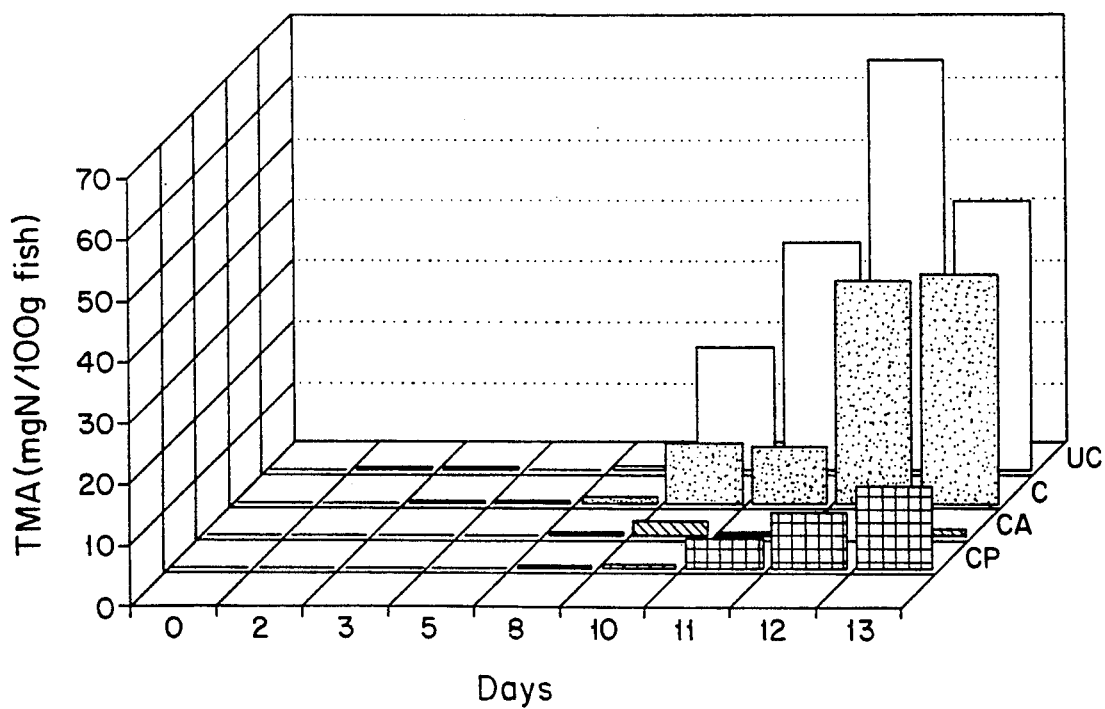

Table 4 and FIG. 4 show the results for Example IV. A whole Cod was shipped overnight from Alaska to the laboratory where it was gutted and cut into pieces the next day. The designated treatments were conducted as follows:

UC=uncoated.

C=coated with an alginate coating.

CA=immersed for 6 seconds in a dilute acetic acid solution maintained at room temperature, then coated.

CP=immersed for 6 seconds in a dilute acetic acid solution maintained at 35° C. before coating with alginate.

The uncoated samples accumulated TMA fastest, just lightly faster than the coated samples which had no additional treatments. The dilute acetic acid treatment (CA), even without heating (CA), significantly retarded TMA production. After 13 days levels of TMA were still low for specimens designated CA and CP.

TABLE 4

| Days | TMA (mgN/100 g fish) | | | |
|------|------|------|------|------|
|      | UC   | C    | CA   | CP   |
| 0    | 0.1  | 0.1  | 0.1  | 0.1  |
| 2    | 0.2  | 0.1  | 0.1  | 0.1  |
| 3    | 0.3  | 0.2  | 0.1  | 0.1  |
| 5    | 0.1  | 0.2  | 0.1  | 0.1  |
| 8    | 0.5  | 0.9  | 0.3  | 0.2  |
| 10   | 20   | 9.5  | 2.2  | 0.4  |
| 11   | 37   | 8.9  | 0.2  | 4.7  |
| 12   | 67   | 36   | 0.3  | 9.4  |
| 13   | 44   | 37   | 0.6  | 13   |

EXAMPLE V

Figure 5:
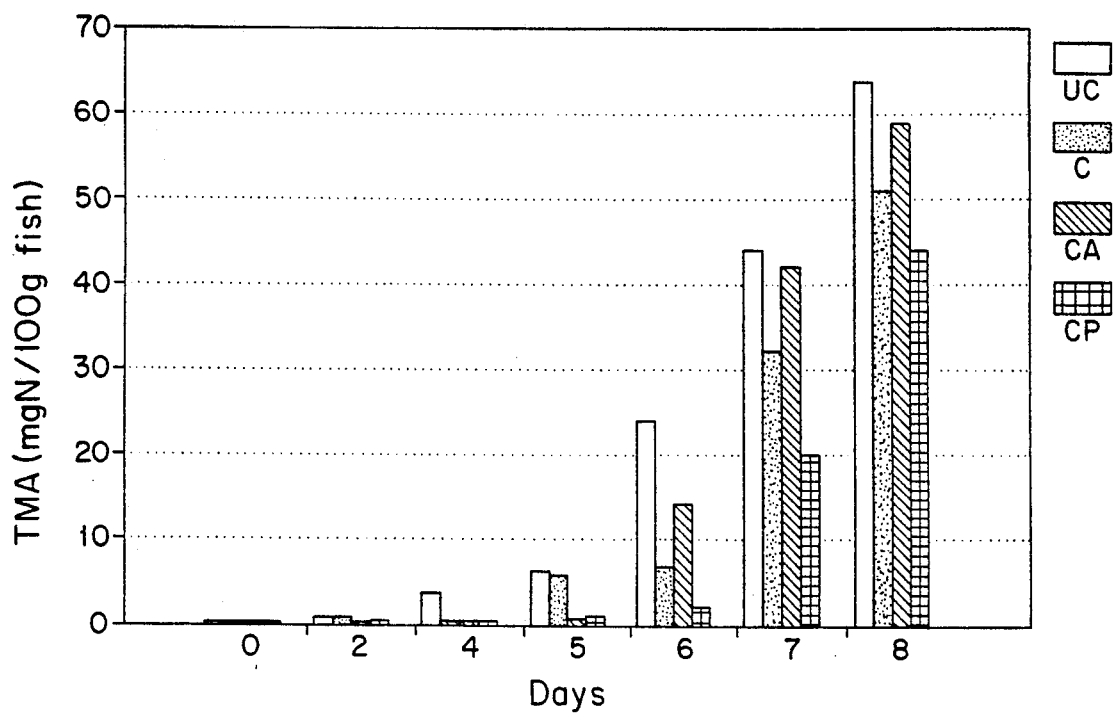

Table 5 and FIG. 5 show results for Example V. A whole Cod was shipped overnight from Alaska to the laboratory where it was gutted and cut into pieces the next day. The designated treatments were as follows:

UC=uncoated.

C=coated with alginate coating.

CA=immersed for 6 seconds in a dilute acetic acid solution maintained at room temperature before coating with alginate.

CP=immersed for 6 seconds in a dilute acetic acid solution maintained at 50° C. before coating with alginate. All samples showed rapid production of TMA, with fastest accumulation in uncoated samples. The TMA standard used was 10 mgN/100g fish. Treatment with the dilute acetic acid solution before coating retarded TMA production, and treatment at 50° C. further retarded the rate of TMA accumulation.

TABLE 5

| | TMA (mgN/100 g fish) | | | |
|---|---|---|---|---|
| Days | UC | C | CA | CP |
| 0 | 0.2 | 0.2 | 0.2 | 0.2 |
| 2 | 0.7 | 0.7 | 0.2 | 0.3 |
| 4 | 3.6 | 0.5 | 0.4 | 0.3 |
| 5 | 6 | 5.7 | 0.6 | 0.9 |
| 6 | 24 | 6.7 | 14 | 2.1 |
| 7 | 44 | 32 | 42 | 20 |
| 8 | 64 | 51 | 59 | 44 |

EXAMPLE VI

Figure 6:
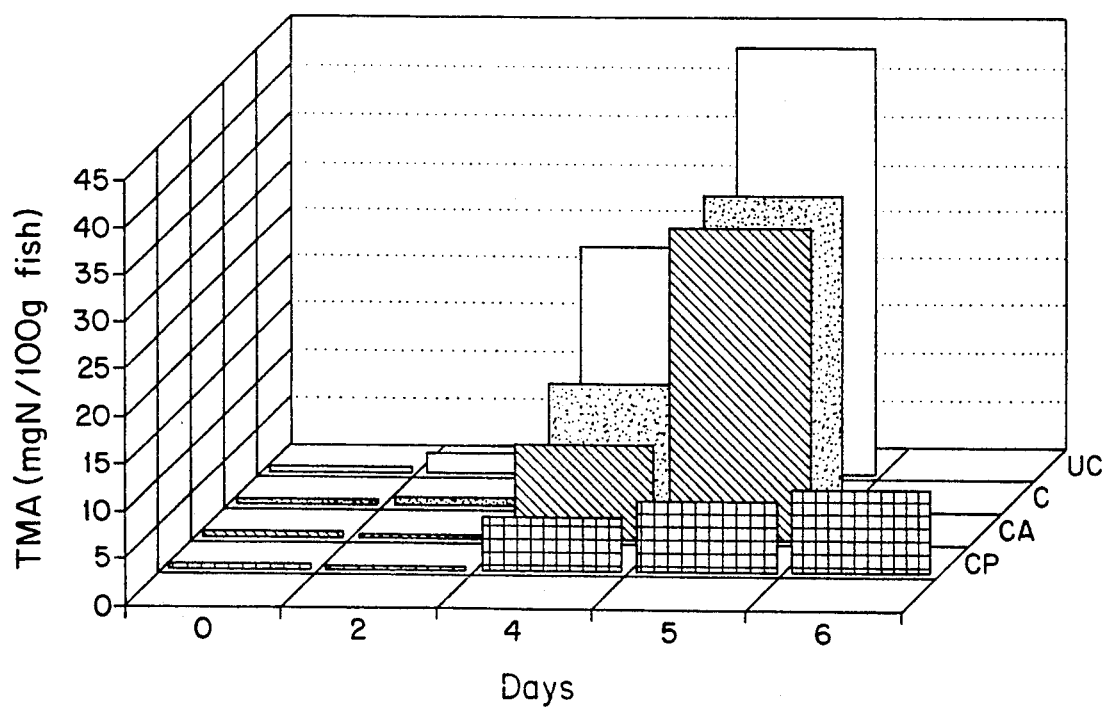

Table 6 and FIG. 6 show the results of Example VI. A whole Cod was shipped overnight from Alaska to the laboratory where it was gutted and cut into pieces the next day. The following designated treatments were conducted:

UC=uncoated.
C=coated with alginate coating.
CA=immersed for 6 seconds in a dilute acetic acid solution maintained at room temperature before coating with alginate.
CP=immersed for 6 seconds in a dilute acetic acid solution maintained at 50° C. before coating with alginate.

Based on the same TMA standard as Examples I–V, TMA accumulation was even faster than in previous Example V. The rates of TMA formation in the uncoated, coated and dilute acetic acid treatment at room temperature were similar. However, the rate of TMA production was slower in the samples treated with warm dilute acetic acid before coating.

TABLE 6

| | TMA (mgN/100 g fish) | | | |
|---|---|---|---|---|
| Days | UC | C | CA | CP |
| 0 | 0.5 | 0.5 | 0.5 | 0.5 |
| 2 | 2 | 0.7 | 0.3 | 0.3 |
| 4 | 24 | 13 | 10 | 5.6 |
| 5 | 45 | 33 | 33 | 7.4 |
| 6 | | | | 8.6 |

EXAMPLES VII–IX

The fish for Examples VII–IX were caught in the North Atlantic, filleted at the pier and shipped overnight to the laboratory. Dilute acetic acid was prepared by adding one volume of 5% white vinegar to five volumes of MilliQ water. The exposure to the diluted acetic acid was for 6 seconds at 50° C. The Flavor-Tex sodium alginate coating was applied after the warm acetic acid treatment; gel component #1 was cold (0–5° C.) as was gel component #2 which had been adjusted to pH 4.0 with acetic acid prior to cooling. The pieces of fish that were treated with warm acetic acid and coated with Flavor-Tex were designated the CP series. The control series (UC) were untreated and uncoated pieces of fish. All pieces of fish were placed in plastic bags and stored in a refrigerator at 5° C.

Figure 7:
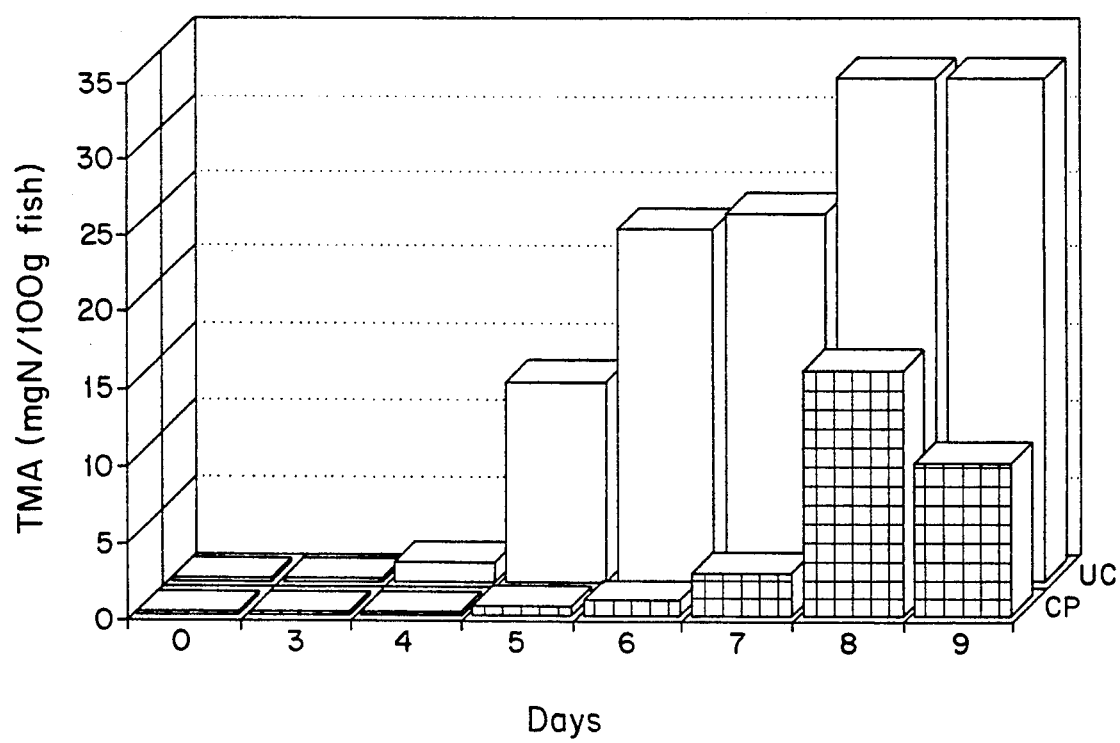

TMA data for Cod is shown for Example VII in Table 7 and FIG. 7. TMA results for Haddock and Yellowtail Flounder for Examples VIII and IX, respectively, are in Table 8. The TMA standard used for Examples VII–IX was 15 mgN/100g fish.

TABLE 7

| TMA Accumulation in Cod | | |
|---|---|---|
| | TMA (mgN/100 g fish) | |
| Days | UC | CP |
| 0 | 0.2 | 0.2 |
| 3 | 0.2 | 0.1 |
| 4 | 1.3 | 0.1 |
| 5 | 13 | 0.6 |
| 6 | 23 | 1.0 |
| 7 | 24 | 2.8 |
| 8 | 33 | 16 |
| 9 | 33 | 10 |

TABLE 8

| TMA Accumulation in Haddock and Yellowtail Flounder | | | | |
|---|---|---|---|---|
| | TMA (mgN/100 g fish) | | | |
| | Haddock | | Yellowtail Flounder | |
| Days | UC | CP | UC | CP |
| 0 | 2.3 | 2.3 | 1.9 | 1.9 |
| 2 | 11 | 11 | 18 | 3.1 |
| 3 | 16 | 6.4 | 19 | 15 |
| 4 | 27 | 18 | 21 | 15 |

Table 9 shows bacterial plate counts, for all three fish of bacteria that grew at refrigerator temperature. Table 10 gives results of plate counts for bacteria that grew at room temperature (20–25° C.).

TABLE 9

| Bacterial Populations (CFU/G Fish) | | | | | | |
|---|---|---|---|---|---|---|
| Growing at Refrigerator Temperature | | | | | | |
| | Cod | | Haddock | | Yellowtail | |
| Days | UC | CP | UC | CP | UC | CP |
| 0 | $1.7 \times 10^4$ | $1.4 \times 10^4$ | $4.5 \times 10^6$ | $1.5 \times 10^7$ | $2.3 \times 10^7$ | $1.1 \times 10^6$ |
| 6 | $3.7 \times 10^8$ | $1.0 \times 10^8$ | — | — | — | — |
| 7 | $9.5 \times 10^8$ | $3.2 \times 10^8$ | — | — | — | — |
| 9 | $0.8 \times 10^9$ | $1.2 \times 10^9$ | $1.6 \times 10^9$ | $1.0 \times 10^9$ | $1.2 \times 10^9$ | $0.6 \times 10^9$ |

TABLE 10

| Bacterial Populations (CFU/G Fish) | | | | | | |
|---|---|---|---|---|---|---|
| Growing at Room Temperature | | | | | | |
| | Cod | | Haddock | | Yellowtail Flounder | |
| Days | UC | CP | UC | CP | UC | CP |
| 0 | $3.4 \times 10^4$ | $3.3 \times 10^4$ | $2.2 \times 10^6$ | $7.0 \times 10^6$ | $1.2 \times 10^7$ | $1.0 \times 10^6$ |

TABLE 10-continued

| | Bacterial Populations (CFU/G Fish) Growing at Room Temperature | | | | | |
|---|---|---|---|---|---|---|
| | Cod | | Haddock | | Yellowtail Flounder | |
| Days | UC | CP | UC | CP | UC | CP |
| 6 | $2.2 \times 10^8$ | $0.9 \times 10^8$ | — | — | — | — |
| 7 | $4.7 \times 10^8$ | $1.7 \times 10^8$ | — | — | — | — |
| 9 | $0.8 \times 10^9$ | $1.4 \times 10^9$ | $1.5 \times 10^9$ | $0.8 \times 10^9$ | $0.9 \times 10^9$ | $0.6 \times 10^9$ |

GENERAL RESULTS

Rates of TMA accumulation were similar in uncoated and coated samples which did not receive additional precoating treatments such as heated immersion and/or acetic acid solution immersion.

Dilute acetic acid solution treatment before coating slowed the rate of TMA production in most experiments.

Examples I and IV, in which TMA formation was generally slow, showed the best inhibitory effects of dilute acetic acid.

Maintaining the dilute acetic acid solution at an elevated temperature enhanced the desired results in Examples I, V and VI.

Clean conditions were observed during storage and filleting or fish to prevent unnecessary contamination of the fish flesh with potential spoilage-causing bacteria. Such bacteria probably originate from the skin and guts of the fish.

Unexpectedly, it has been found that an immersion treatment with a dilute aqueous solution of acetic acid for at least 6 seconds before coating with an alginate coating retards the rates of tissue spoilage. Heating the dilute acetic acid to an elevated temperature of from about 20° C. to about 50° C. further lowers the populations of spoilage-causing bacteria. The second step of cooling after heating the fish flesh is conveniently incorporated into the coating procedure by using a first alginate-containing solution maintained at from 0° C. to 5° C.

In Example VII, the warm acetic acid/alginate coating treatment successfully retarded spoilage in the cod. Accumulation of TMA to unacceptable levels of about 15 mgN/g fish did not occur until after 8 days refrigeration whereas for the untreated fish this level was reached after about 5 days of refrigeration (See Table 7). The bacterial populations, in accord with the chemical measurements, were about 2-3 fold lower through 7 days in the treated samples as compared to the untreated samples, but attained similar values after 9 days.

The Haddock and Yellowtail Flounder fillets in Examples VIII and IX, respectively, were not fresh as indicated by the initial TMA concentrations and bacterial populations. Spoilage therefore occurred quickly, within about 2-3 days at refrigerator temperatures. Regardless, the results indicate that the treatment retarded spoilage for the Yellowtail samples since unacceptable TMA levels in the untreated fish pieces were attained after 2 days in comparison to 3 days for the treated samples.

Treatment with a warm acetic acid solution did not appreciably depress the initial populations of bacteria associated with the fish. The bacteria, which are motile, undoubtedly spread through out the fish tissues during transport from the catch location to the laboratory. Exposure to an elevated temperature for at least 6 seconds is needed to get heat penetration throughout the tissue and thereby kill more bacteria.

Having thus set forth and disclosed the nature of this invention, what is claimed is:

1. A fresh cold water fish processing method comprising the steps of:
    a) cutting a fresh cold water fish and removing it entrails to produce an eviscerated fish carcass,
    b) washing the eviscerated fish carcass to effect cleaning of exposed surfaces of the fish flesh,
    c) promptly subjecting the fish flesh to a bactericide in an amount sufficient to substantially reduce the number of spoilage-causing bacteria and retard the formation of trimethylamine in the fish flesh, said bactericide being in a solution maintained at an elevated temperature effective to enhance said reduction and retardation results, and
    d) said bactericide being effective in penetrate cell membranes in fresh cold water fish wherein the bactericide adversely affects the intracellular pH of the bacteria.

2. The method as defined in claim 1, wherein
    the bactericide subjecting step includes providing a bactericide treating zone for receiving eviscerated fish flesh from the washing step and maintaining the fish flesh within the bactericide treating zone for a time sufficient to allow the bactericide to produce its said reduction and retardation results.

3. The method as defined in claim 1, wherein
    the fish cutting step includes the step of filleting the eviscerated fish carcass to form a plurality of fish flesh parts having exposed surfaces treated by said washing and bactericide treating steps.

4. The method as defined in claim 1, wherein
    the bactericide subjecting step includes keeping the fresh fish flesh in the heated bactericide solution for a time sufficient to allow the bactericide to produce the desired reduction and retardation results.

5. The method as defined in claim 1, wherein
    after said bactericide subjecting step, applying an alginate coating over the exposed surfaces of fresh fish flesh to produce a sealing effect along the fish flesh surfaces.

6. The method as defined in claim 1, wherein
    before said fish cutting step, maintaining the whole fresh cold water fish at a temperature sufficiently below ambient temperature to inhibit the reproduction of spoilage-causing bacteria until the cutting step.

7. A method of treating eviscerated fresh cold water fish having exposed flesh surfaces, said method comprising:
    a) providing an aqueous solution of an uncharged acetic acid adapted to form a bactericide environment for spoilage-causing bacteria that produce trimethylamine in fresh cold water fish,
    b) said aqueous solution being effective to kill said spoilage-causing bacteria on said exposed flesh surfaces without producing a flavor distinctive from the natural flavor of said fish after it has been cooked, and c) treating said exposed flesh surfaces with said aqueous solution for a time sufficient to substantially reduce the number of spoilage-causing bacteria thereon without any flavor derived from said solution being absorbed by the fish flesh, d) said acid being effective to penetrate cell membranes in fresh cold water fish and adversely affect the intracellular pH of the spoilage-causing bacteria.

8. A method as defined in claim 7, wherein
the aqueous solution treating step is effective to maintain the level of trimethylamine at less than about 15 mgN per 100 grams of fish flesh for an extended period of time.

9. A method as defined in claim 7, wherein the fresh cold water fish is a fin fish.

10. A method as defined in claim 7, wherein
after the aqueous acid treating step applying an alginate-coating over the exposed surfaces of the fresh fish flesh to produce a sealing effect along the fish flesh surfaces,
said alginate coating applying step including providing an aqueous alginate containing solution and an aqueous gelling solution,
said gelling solution being maintained with a pH of at least as low as 4.0.

11. A method as defined in claim 10, wherein
the gelling solution contains acetic acid to maintain the gelling position at said pH level.

12. A method as defined in claim 10, wherein
maintaining the alginate containing solution and said gelling solution at a lower temperature to cool the fish flesh from the effects of the elevated temperature treatment while producing said alginate coating over the exposed surfaces of the fresh fish.

13. A method as defined in claim 12, wherein
said lowered temperature of the alginate-containing solution and gelling solution is about 2° C. to about 5° C.

14. A method of treating eviscerated fresh cold water fish having exposed flesh surfaces, said method comprising:

a) providing an aqueous solution of an acid adapted to form a bactericide environment for spoilage-causing bacteria that produce trimethylamine in fresh cold water fish, b) said aqueous solution being effective to kill said spoilage-causing bacteria on said exposed flesh surfaces without producing a flavor distinctive from the natural flavor of said fish after it has been cooked, and c) treating said exposed flesh surfaces with said aqueous solution for a time sufficient to substantially reduce the number of spoilage-causing bacteria thereon without any flavor derived from said solution being absorbed by the fish flesh, d) the aqueous acid solution consists essentially of one part of a 5% vinegar to 5 parts of water and is effective to penetrate cell membranes in fresh cold water fish and adversely affect the intracellular pH of the spoilage-causing bacteria.

15. A method of treating eviscerated fresh cold water fish having exposed flesh surfaces, said method comprising:

a) providing an aqueous solution of an acid adapted to form a bactericide environment for spoilage-causing bacteria that produce trimethylamine in fresh cold water fish, b) said aqueous solution being effective to kill said spoilage-causing bacteria on said exposed flesh surfaces without producing a flavor distinctive from the natural flavor of said fish after it has been cooked, and c) treating said exposed flesh surfaces with said aqueous solution for a time sufficient to substantially reduce the number of spoilage-causing bacteria thereon without any flavor derived from said solution being absorbed by the fish flesh, d) the aqueous solution comprises about five parts of acetic acid in about six hundred parts of solution and is effective to penetrate cell membranes in fresh cold water fish and adversely affect the intracellular pH of the spoilage-causing bacteria.

16. A method of treating eviscerated fresh cold water fish having exposed flesh surfaces, said method comprising:

a) providing an aqueous solution of an acid adapted to form a bactericide environment for spoilage-causing bacteria that produce trimethylamine in fresh-cold water fish, b) said aqueous solution being effective to kill said spoilage-causing bacteria on said exposed flesh surface without producing a flavor distinctive from the natural flavor of said fish after it has been cooked, and c) treating said exposed flesh surfaces with said aqueous solution for a time sufficient to substantially reduce the number of spoilage-causing bacteria thereon without any flavor derived from said solution being absorbed by the fish flesh, d) said acid being effective to penetrate cell membranes in fresh cold water fish and adversely affect the intracellular pH of the spoilage-causing bacteria, and e) the aqueous solution treating step includes heating the aqueous solution to an elevated temperature sufficient to enhance the retardation of trimethylamine formation in the fish flesh and for a period of time at said elevated temperature effective to preclude discoloration of the fish flesh.

17. A method as defined in claim 16, wherein
the elevated temperature is in the range of from about 20° C. to about 50° C.

18. A method as defined in claim 16, wherein
the elevated temperature is at least 20° C.

19. A method as defined in claim 16, wherein
the period of time at said elevated temperature is at least 6 seconds.

20. A method as defined in claim 16, wherein
the period of time at said elevated temperature is in the range of 6 to 15 seconds.

* * * * *